United States Patent
Kato et al.

(10) Patent No.: US 6,532,331 B1
(45) Date of Patent: Mar. 11, 2003

(54) SINGLE-MODE OPTICAL FIBER FLOOR LONG HAUL TRANSMISSION

(75) Inventors: Takatoshi Kato, Yokohama (JP); Masashi Onishi, Yokohama (JP); Eisuke Sasaoka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 171 days.

(21) Appl. No.: 09/698,105

(22) Filed: Oct. 30, 2000

Related U.S. Application Data (63) Continuation-in-part of application No. PCT/JP98/05824, filed on Dec. 22, 1998.

(30) Foreign Application Priority Data

Apr. 30, 1998 (JP) ............................................ 10-121262

(51) Int. Cl.$^7$ .............................. G02B 6/02; G02B 6/16
(52) U.S. Cl. ..................................................... 385/123
(58) Field of Search ................................. 385/123, 124, 385/125, 126, 127, 147

(56) References Cited

U.S. PATENT DOCUMENTS

| | | | |
|---|---|---|---|
| 4,852,968 A | 8/1989 | Reed | 350/96.33 |
| 5,613,027 A | 3/1997 | Bhagavatula | 385/123 |
| 5,659,649 A | 8/1997 | Nouchi et al. | 385/124 |
| 5,675,690 A | * 10/1997 | Nouchi et al. | 385/127 |

FOREIGN PATENT DOCUMENTS

| | | |
|---|---|---|
| EP | 0 724 171 | 7/1996 |
| JP | 63-43107 | 2/1988 |
| JP | 2-141704 | 5/1990 |
| JP | 8-248251 | 9/1996 |
| JP | 8-304655 | 11/1996 |
| JP | 9-33744 | 2/1997 |
| JP | 9-159856 | 6/1997 |
| JP | 9-258054 | 10/1997 |

OTHER PUBLICATIONS

"Estimation of nonlinear refractive index in various silica–based glasses for optical fibers", T. Kato et al., Optics Letters, vol. 20, No. 22, Nov. 15, 1995.

* cited by examiner

Primary Examiner—Javaid Nasri
(74) Attorney, Agent, or Firm—McDermott, Will & Emery

(57) ABSTRACT

The present invention relates to an optical fiber comprising a structure which effectively suppresses the occurrence of nonlinear phenomena without increasing transmission loss such as macrobending loss. The optical fiber according to the present invention comprises, radially in succession from the center axis thereof, a center region having a predetermined refractive index, a first annular region having a higher refractive index than the center region, and a second annular region doped with fluorine and having a lower refractive index than the first annular region. In particular, this optical fiber has an effective area of 70 $\mu m^2$ or more with respect to light having a wavelength of 1550 nm, whereas the fluorine contents in the second annular region is adjusted such that the refractive index thereof decreases with distance from the center of the optical fiber.

4 Claims, 9 Drawing Sheets

SINGLE-MODE OPTICAL FIBER FLOOR LONG HAUL TRANSMISSION

RELATED APPLICATIONS

This is a Continuation-In-Part application of International Patent application serial No. PCT/JP98/05824 filed on Dec. 22, 1998, now pending, which in turn claims the benefit of Japanese Patent Application No. 10-121262, filed Apr. 30, 1998, the disclosures of which Applications are incorporated by reference herein. The benefit of the filing and priority dates of the International and Japanese Applications is respectfully requested.

BACKGROUND OF THE INVENTION

1. Field of the Invention

The present invention relates to a single-mode optical fiber usable as a long-haul transmission line for optical communications and the like; and, in particular, to a dispersion-shifted fiber suitable for large-capacity optical communications-such as wavelength division multiplexing (WDM) transmission and the like.

2. Related Background Art

Conventionally, light in a 1.3-$\mu$m wavelength band or 1.55-$\mu$m wavelength band has often been utilized as light signals for communications in optical communications systems employing single-mode optical fibers as their transmission lines. Recently, however, the use of light in 1.55-$\mu$m wavelength band has been increasing from the viewpoint of lowering transmission loss in transmission lines. Single-mode optical fibers employed in such a transmission line for light in the 1.55-$\mu$m wavelength band (hereinafter referred to as 1.55-$\mu$m single-mode optical fibers) have been designed such that their chromatic dispersion (phenomenon in which pulse waves widen because of the fact that the propagation speed of light varies depending on wavelength) with respect to light in the 1.55-$\mu$m wavelength band becomes zero (so as to yield dispersion-shifted fibers having a zero-dispersion wavelength of 1.55 $\mu$m).

As such a dispersion-shifted fiber, Japanese Patent Application Laid-Open No. HEI 8-304655 (U.S. Pat. No. 5,613,027) and U.S. Pat. No. 5,659,649, for example, propose a dispersion-shifted fiber having a refractive index profile of a ring-like core structure, whose core region is constituted by an inner core and an outer core having a higher refractive index than the inner core. Also, Japanese Patent Application Laid-Open No. HEI 8-248251 (European Patent Publication No. 0 724 171 A2) and Japanese Patent Application Laid-Open No. HEI 9-33744 propose a dispersion-shifted fiber having a refractive index profile of a dual ring core structure, whose core region is constituted by a first core, a second core having a higher refractive index than the first core, a third core having a lower refractive index than the second core, and a fourth core having a higher refractive index than the third core.

On the other hand, Japanese Patent Application Laid-Open No. SHO 63-43107 and Japanese Patent Application Laid-Open No. HEI 2-141704 propose a depressed cladding structure whose cladding region is constituted by an inner cladding and an outer cladding having a higher refractive index than the inner cladding.

In recent years, the advent of wavelength division multiplexing (WDM) transmission and optical amplifiers has further enabled long-haul transmission, and various improvements have been made as to optical fibers such as those mentioned above in order to avoid nonlinear phenomena. Here, nonlinear optical effects refer to phenomena in which light signal pulses distort in proportion to the density of light intensity or the like due to nonlinear phenomena such as four-wave mixing (FWM), self-phase modulation (SPM), cross-phase modulation (XPM), and the like, and become a factor restricting the transmission speed and the repeater spacing in repeating transmission systems.

SUMMARY OF THE INVENTION

In general, the amount of occurrence of nonlinear phenomena has been known to be proportional to the amount of change in refractive index given by the following expression (1):

$$(N_2/A_{eff}) \times P \quad (1)$$

where $N_2$ is the nonlinear refractive index (unit: m$^2$/W), $A_{eff}$ is the effective area (unit: $\mu$m$^2$), and P is the optical power.

Here, the nonlinear refractive index $N_2$ is defined as follows. Namely, the refractive index $<N>$ of a medium under strong light varies depending on the optical power. Therefore, the lowest-order effect on this refractive index $<N>$ is given by the following expression (2):

$$<N> = <N_0> + <N_2> \cdot I \quad (2)$$

where $<N_0>$ is the refractive index with respect to linear polarization, $<N_2>$ is the nonlinear refractive index with respect to nonlinear polarization, and I is the light intensity. Under strong light, the refractive index $<N>$ of the medium is given by the sum of its normal value $<N_0>$ and the increase proportional to the light intensity. In particular, the constant of proportion $<N_2>$ (unit: m$^2$/W) in the second term is known as nonlinear refractive index.

On the other hand, as shown in Japanese Patent Application Laid-Open No. HEI 8-248251 (EP 0 724 171 A2), the effective area $A_{eff}$ is given by the following expression (3):

$$A_{eff} = 2\pi \left( \int_0^\infty E^2 r \, dr \right)^2 / \left( \int_0^\infty E^4 r \, dr \right) \quad (3)$$

where E is the electric field accompanying the propagating light, and r is the radial distance from the core center (the center axis of the optical fiber).

Each of the above-mentioned conventional optical fibers has been designed so as to enhance the effective area $A_{eff}$ in order to suppress the occurrence of nonlinear phenomena. However, the inventors have studied the conventional optical fibers and, as a result, have found problems as follows. Namely, there is inevitably a limit to the enhancement of effective area $A_{eff}$ since it increases the transmission loss upon bending the optical fiber at a predetermined radius (hereinafter referred to as macrobending loss) and the transmission loss due to an external pressure (side pressure) applied to the side face of the optical fiber (hereinafter referred to as microbending loss). Though the microbending loss of optical fibers having a refractive index profile of a ring-like core structure is lower than that of optical fibers having other refractive index profiles such as those of dual ring core and multilayer core structures in general, there is still an upper limit to the above-mentioned enhancement. Thus, the increase in macrobending loss and microbending loss along with the enhancement of effective area $A_{eff}$ is an essential problem of optical fibers, which is inescapable.

In order to overcome problems such as those mentioned above, it is an object of the present invention to provide an optical fiber comprising a structure which effectively suppresses the occurrence of nonlinear phenomena without increasing transmission loss such as macrobending loss.

The optical fiber according to the present invention is suitable for a single-mode optical fiber which is mainly composed of silica glass and which has a core region extending along a predetermined axis and a cladding region provided on the outer periphery of the core region. Also, in view of its application to the wavelength division multiplexing transmission and the like in recent years, the optical fiber according to the present invention has, with respect to light having a wavelength of 1550 nm, a dispersion with an absolute value of 1.0 to 4.5 ps/nm/km and an effective area of 70 $\mu m^2$ or more, and has a cutoff wavelength of 1.3 $\mu m$ (1300 nm) or more at a fiber length of 2 m.

Figure 1A:
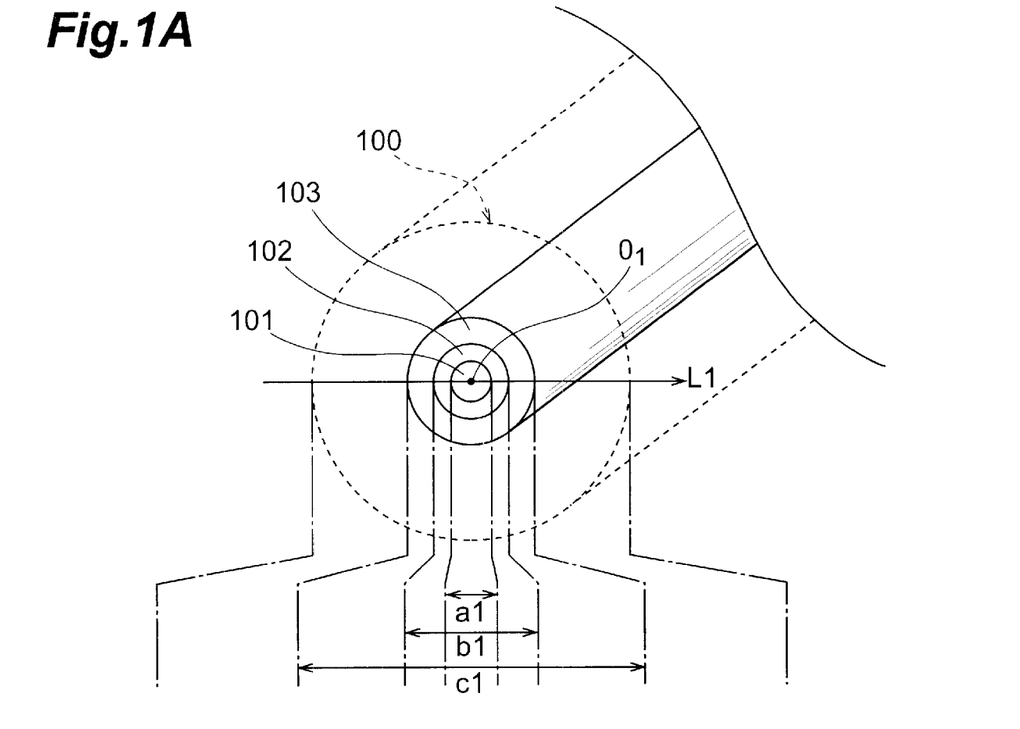
FIGS. 1A and 1B are views illustrating major parts of the optical fiber according to the present invention, showing a cross-sectional structure thereof and a refractive index profile thereof, respectively.
Figure 1B:
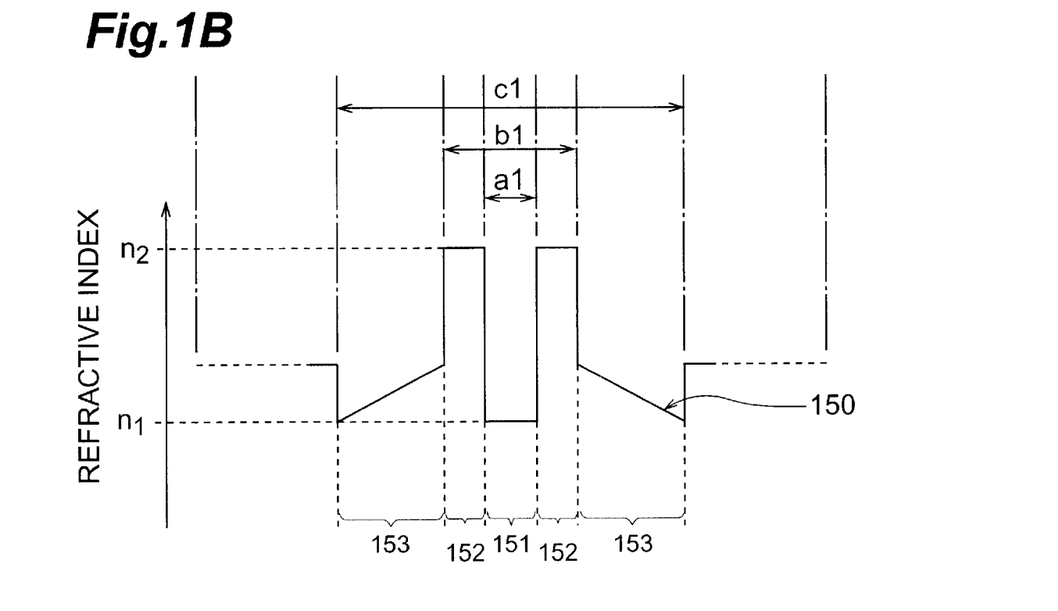

Specifically, as shown in FIGS. 1A and 1B, the optical fiber according to the present invention comprises, at least, a center region 101 extending along a center axis and having a predetermined refractive index; a first annular region 102 provided on the outer periphery of the center region 101 and having a higher refractive index than the center region 101; and a second annular region 103 provided on the outer periphery of the first annular region 102 and having a lower refractive index than the first annular region 102.

In particular, in order to lower the nonlinear refractive index $N_2$ so as to suppress the occurrence of nonlinear phenomena (see the above-mentioned expression (1)), contents of fluorine, which is a refractive index reducing dopant, in the second annular region 103 is adjusted such that the refractive index thereof radially decreases from the center of the optical fiber 100. Also, in the optical fiber according to the present invention, the radius of the first annular region 102 is set to 1.5 $\mu m$ or more in particular in order to keep the optical power from concentrating near the center axis. Here, the relationship between the effective area $A_{eff}$ given by the above-mentioned expression (3) and the mode field diameter MFD is given by the following expression (4):

$$A_{eff} = k \cdot (\pi/4) \cdot (MFD)^2 \qquad (4)$$

and the constant of proportion k in this expression (4) is preferably 1.4 or more.

As shown in T. Kato, et al., "Estimation of nonlinear refractive index in various silica-based glasses for optical fibers" (OPTICS LETTERS, Vol. 20, No. 22, Nov. 15, 1995), the dependence of nonlinear refractive index $N_2$ upon fiber compositions has been known to be the lowest in pure silica and increase as impurities such as fluorine are added thereto. On the other hand, among the individual regions of the optical fiber, the contribution of the first annular region 102 to the nonlinear refractive index $N_2$ is greater than that of the second annular region 103, and the first annular region 102 also greatly contributes to determining the above-mentioned various characteristics of the optical fiber at a wavelength of 1550 nm.

Therefore, the present invention takes account of the second annular region 103 positioned outside the first annular region 102. Specifically, the contents of fluorine is controlled such that the shape of the refractive index profile in the second annular region 103 is tilted from the center of the optical fiber 100 to ward its perimeter. Namely, while being made smaller in an inner part of the second annular region 103 in which the light propagating through the optical fiber 100 has a higher power, the fluorine contents are increased toward an outer part of the second annular region 103 (as the optical power of propagating light weakens), so as to intentionally tilt the refractive index profile in the second annular region 103, thereby lowering the nonlinear refractive index $N_2$ of the whole optical fiber.

From results of experiments which will be mentioned later, the inventors have found it preferable to tilt the refractive index profile in the second annular region 103 such that the relative refractive index difference of the second annular region 103 with respect to a reference glass region lowers by 0.02% or more per distance of 1 $\mu m$ from the center of the optical fiber. In the case where the shape of refractive index profile in the second annular region 103 is not linear, the value (%/$\mu m$) indicating the gradient of refractive index profile is given by the gradient of an approximate line obtained by the method of least squares or the like.

Various modes are applicable to the structure of refractive index profile realizing the optical fiber according to the present invention. Namely, ring-like core structures, dual ring structures, multilayer core structures, and the like are employable as the structure of refractive index profile in the core region of the optical fiber, whereas depressed cladding structures are employable as the refractive index profile in the cladding region.

Figure 2A:
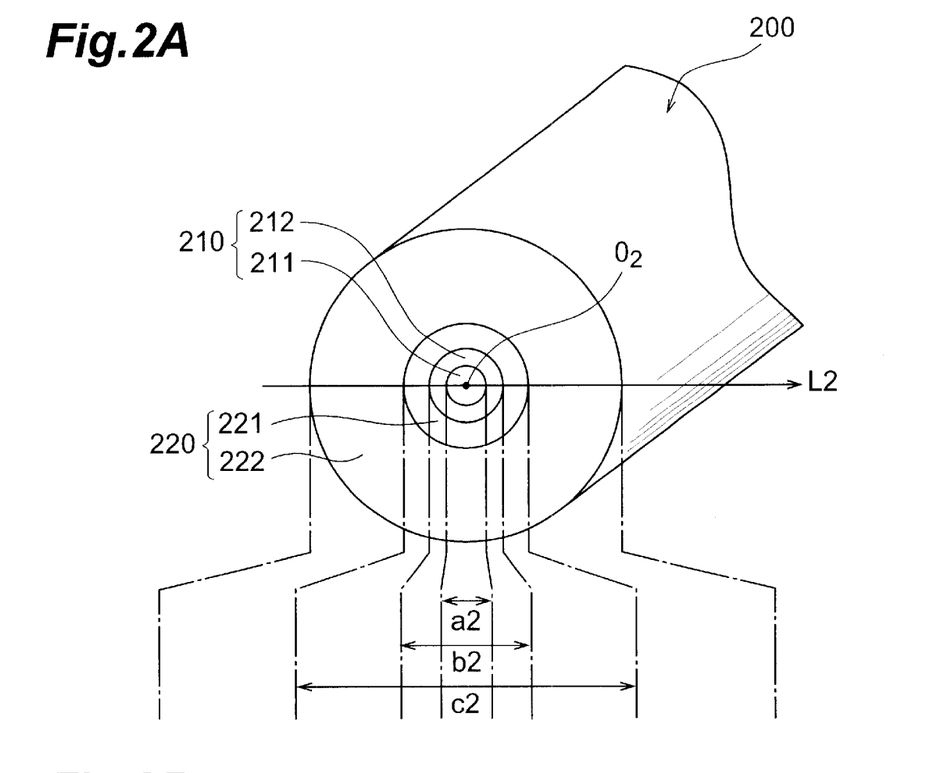
FIGS. 2A and 2B are views illustrating a first embodiment of the optical fiber according to the present invention, showing a cross-sectional structure thereof and a refractive index profile (ring-like core/depressed cladding structure) thereof, respectively.
Figure 2B:
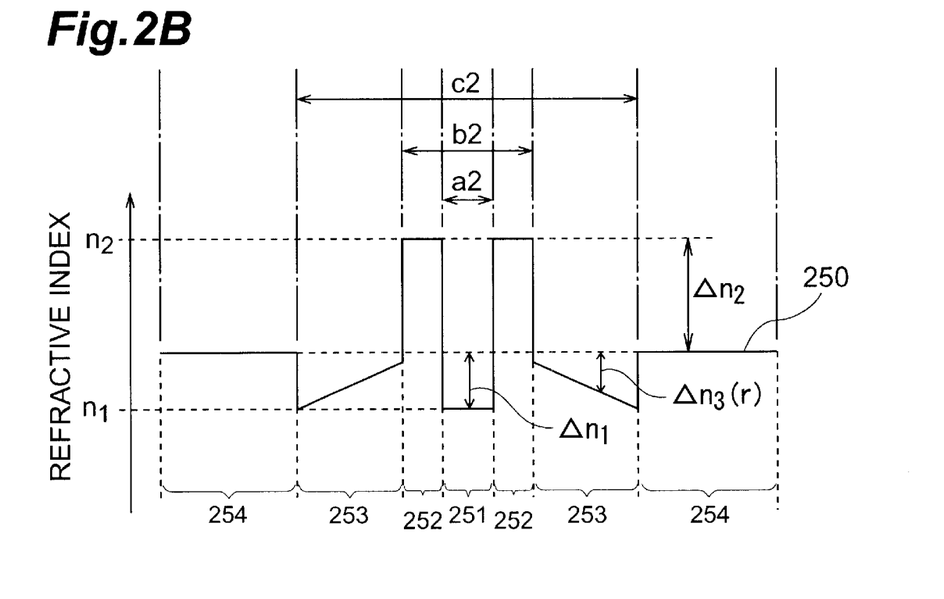

For example, in the case where a refractive index profile of a ring-like core/depressed cladding structure such as the one 250 shown in FIGS. 2A and 2B is employed as the refractive index profile of the optical fiber according to the present invention, the center region 101 corresponds to the inner core 211 extending along the center axis of the optical fiber 200, the first annular region 102 corresponds to the outer core 212 provided on the outer periphery of the inner core 211, and the second annular region 103 corresponds to the inner cladding 221 provided on the outer periphery of the outer core 212. Here, a refractive index difference is given to each of the glass regions 211, 212, 221 with reference to the outer cladding 222 provided on the outer periphery of the inner cladding 221.

Figure 7A:
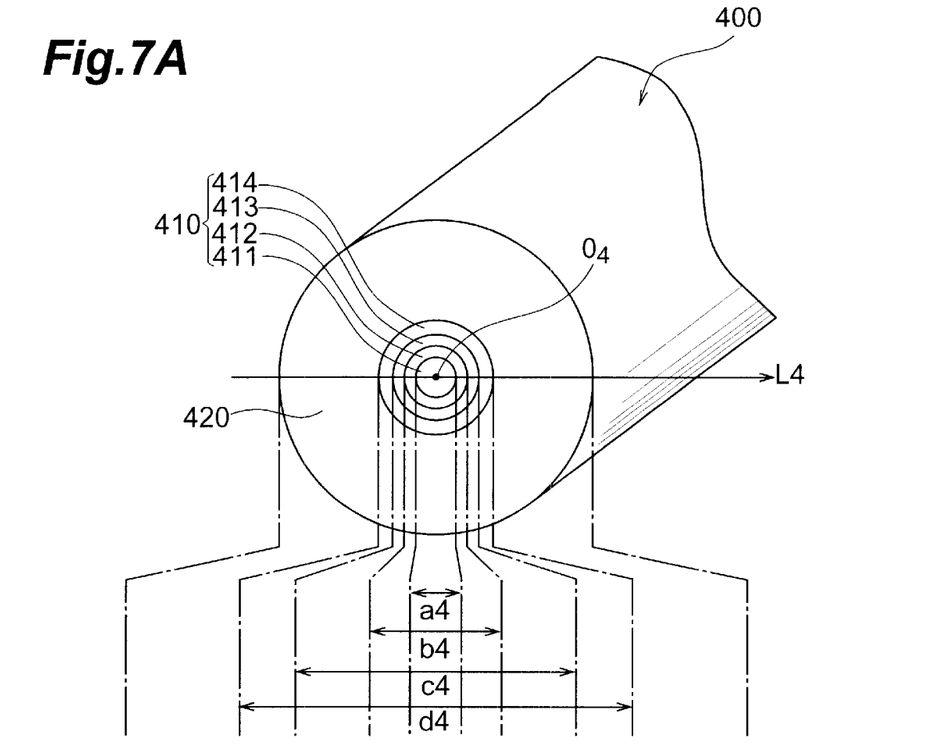
FIGS. 7A and 7B are views illustrating a second embodiment of the optical fiber according to the present invention, showing a cross-sectional structure thereof and a refractive index profile (dual ring core structure) thereof, respectively.
Figure 7B:
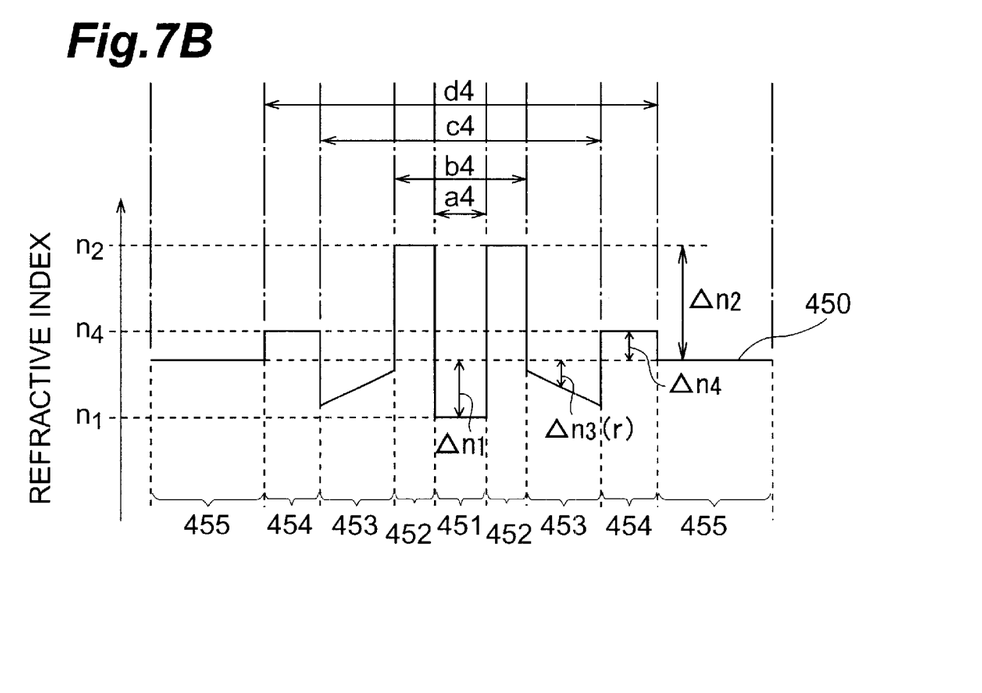

In the case where a refractive index profile of a dual ring core structure such as the one 450 shown in FIGS. 7A and 7B is employed as the refractive index profile of the optical fiber according to the present invention, the center region 101 corresponds to the first core 411 extending along the center axis of the optical fiber 400, the first annular region 102 corresponds to the second core 412 provided on the outer periphery of the first core 411, and the second annular region 103 corresponds to the third core 413 provided on the outer periphery of the second core 412. In the optical fiber 400 of FIGS. 7A and 7B, the fourth core 414 is provided on the outer periphery of the third core 413, and the cladding region 420 is provided on the outer periphery of the fourth core. A relative refractive index difference is given to each-of the glass regions 411, 412, 413, 414 with reference to the cladding region 420. This refractive index profile 450 may also employ a depressed cladding structure.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, the optical fiber according to the present invention will be explained with reference to FIGS. 1A to 2B, 3, 4A, 4B, 5, 6, 7A to 8B, and 9. Among the drawings, parts identical to each other will be referred to with numerals or letters identical to each other without repeating their overlapping descriptions.

FIGS. 1A and 1B are views illustrating major parts of the optical fiber according to the present invention, showing a cross-sectional structure thereof and a refractive index profile thereof, respectively. The optical fiber 100 according to the present invention is an optical fiber, mainly composed of silica glass, having a core region extending along the center axis and a cladding region formed at the outer periphery of the core region. The optical fiber 100 comprises, at least, a center region 101 having a predetermined refractive index $n_1$ and an outside diameter a1; a first annular region 102 provided on the outer periphery of the center region 101, having a higher refractive index $n_2$ than the center region 101 and an outside diameter b1; and a second annular region 103 provided on the outer periphery of the first annular region 102 and having a lower refractive index $n_3(r)$ than the first annular region 102 and an outside diameter c1. In particular, the second annular region 103 is doped with impurities such as fluorine such that its refractive index $n_3(r)$ gradually decreases from the center of the optical fiber 100 toward the perimeter. Here, r is the radial distance from the center of the optical fiber 100.

Here, the abscissa of the refractive index profile 150 shown in FIG. 1B corresponds to each position of the line L1 in FIG. 1A. Also, in FIG. 1A, $O_1$ indicates the intersection between the center axis of the optical fiber 100 and the line L1. Specifically, this refractive index profile 150 indicates the refractive index in each glass region, such that areas 151, 152, and 153 correspond to individual parts on the line L1 of the center region 101, first annular region 102, and second annular region 103, respectively.

As mentioned above, the amount of occurrence of nonlinear phenomena is proportional to the amount of change given by the above-mentioned expression (1). In view of the limit to the enhancement of effective area $A_{\textit{eff}}$ due to macrobending loss and microbending loss, the present invention provides a structure which suppresses the occurrence of nonlinear phenomena by lowering the nonlinear refractive index $N_2$.

As shown in T. Kato, et al., "Estimation of nonlinear refractive index in various silica-based glasses for optical fibers" (OPTICS LETTERS, Vol. 20, No. 22, Nov. 15, 1995), the dependence of nonlinear refractive index $N_2$ upon fiber compositions has been known to be the lowest in pure silica and increase as impurities such as fluorine are added thereto. Among the individual regions of the optical fiber, on the other hand, the contribution of the first annular region 102 to the nonlinear refractive index $N_2$ is greater than that of the second annular region 103, and the first annular region 102 also greatly contributes.to determining the above-mentioned various characteristics of the optical fiber at a wavelength of 1550 nm.

Therefore, the present invention takes account of the second annular region 103 positioned outside the first annular region 102, and controls the contents of fluorine such that the shape of the refractive index profile in the second annular region 103 is tilted from the center of the optical fiber 100 toward its perimeter. Namely, while being made smaller in an inner part of the second annular region 103 in which the light propagating through the optical fiber 100 has a higher power, the fluorine contents are increased toward an outer part of the second annular region 103 (as the optical power of propagating light weakens), so as to intentionally tilt the refractive index profile in the second annular region 103, thereby lowering the nonlinear refractive index $N_2$ of the whole optical fiber. As a result, the optical fiber 100 according to the present invention is designed such that the refractive index in the inner part of the second annular region 103 is higher than that in the outer part of the annular region 103.

First Embodiment

A first embodiment of the optical fiber according to the present invention will now be explained with reference to FIGS. 2A, 2B, and 3. The optical fiber according to the first embodiment has a refractive index profile of a ring-like core/depressed cladding structure.

Figure 3A:
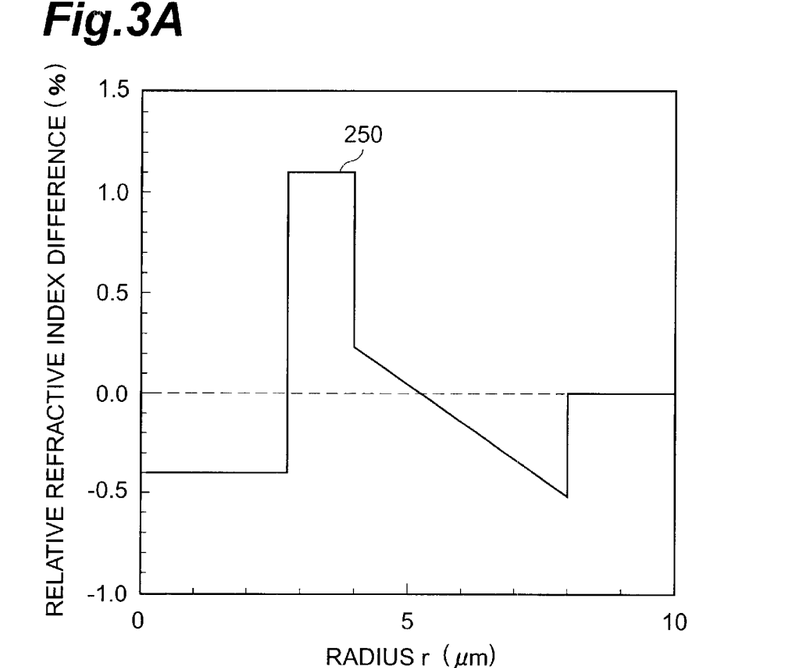
FIGS. 3A and 3B are graphs respectively showing a relationship between the refractive index profile and optical power distribution in the optical fiber according to the first embodiment.
Figure 3B:
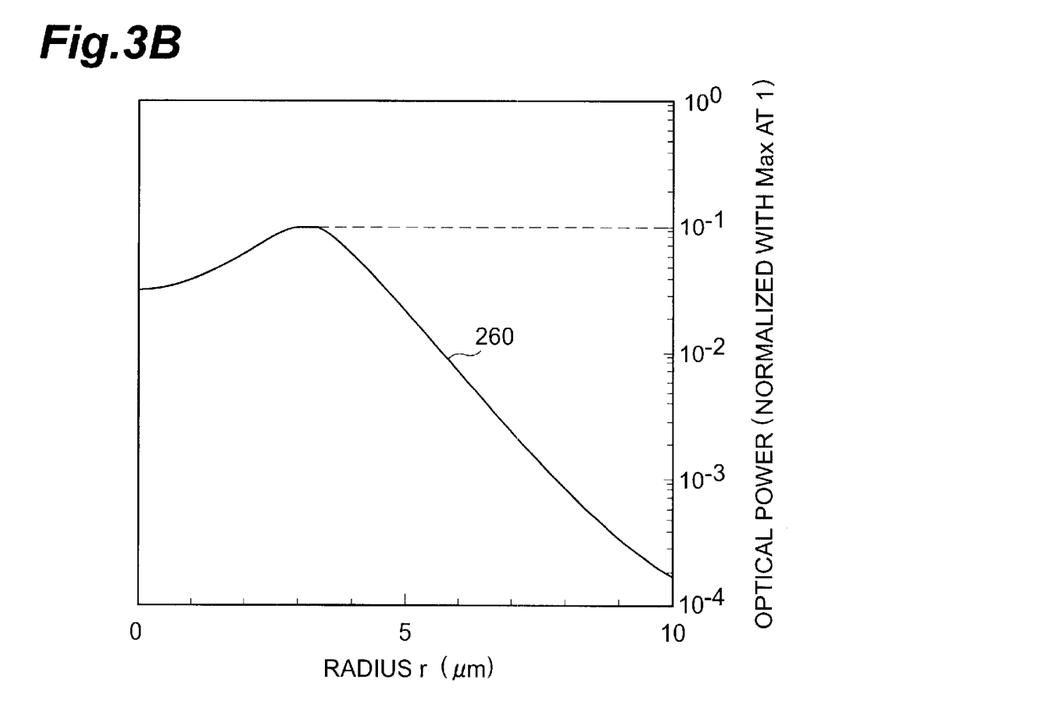

FIGS. 2A and 2B are views illustrating the first embodiment of the optical fiber according to the present invention, showing a cross-sectional structure thereof and a refractive index profile (ring-like core/depressed cladding structure) thereof, respectively. FIGS. 3A and 3B are graphs respectively showing a relationship between the refractive index profile 250 and optical power distribution 260 in the optical fiber 200 according to the first embodiment. The optical power distribution 260 in FIG. 3B is normalized with its maximum value taken as 1.

The optical fiber 200 according to the first embodiment is also an optical fiber, mainly composed of silica glass, having a core region 210 extending along the center axis and a cladding region 220 formed at the outer periphery of the core region 210. In the optical fiber 200, the core region 210 is constituted by an inner core 211 having a refractive index $n_1$ and an outside diameter a2; and an outer core 212 provided on the outer periphery of the inner core 211 and having a refractive index $n_2$ ($>n_1$) and an outside diameter b2. The cladding region 220 is constituted by an inner cladding 221 provided on the outer periphery of the outer core 212, doped with fluorine such that its refractive index $n_3(r)$ ($<n_2$) gradually decreases from the center of the optical fiber 200 toward the perimeter, and having an outside diameter c2; and an outer cladding 222 provided on the outer periphery of the inner cladding 221 and having a refractive index $n_4$ ($>n_3(r)$). Here, r is the radial distance from the center of the optical fiber 200.

Therefore, in the optical fiber 200 according to the first embodiment, the inner core 211, outer core 212, and inner cladding 221 correspond to the center region 101, first annular region 102, and second annular region 103, respectively.

The abscissa of the refractive index profile 250 shown in FIG. 2B corresponds to each position of the line L2 in FIG. 2A, whereas $O_2$ in FIG. 2A indicates the intersection between the center axis of the optical fiber 200 and the line L2. Specifically, this refractive index profile 250 indicates the respective relative refractive index differences of the glass regions 211, 212, 221 with respect to the outer cladding 222, such that areas 251, 252, 253, and 254 correspond to individual parts on the line L2 of the inner core 211, outer core 212, inner cladding 221, and outer cladding 222, respectively.

In this specification, the relative refractive index difference Δ is defined as represented by the following expression (5):

$$\Delta = (n_t^2 - n_c^2)/2n_c^2 \cong (n_t - n_c)/n_c \quad (5)$$

where $n_c$ corresponds to the refractive index $n_4$ of the outer cladding 222 acting as a reference, whereas $n_t$ corresponds to the respective refractive indices $n_1, n_2, n_3(r)$ of the glass regions 211, 212, 221. Therefore, with respect to the outer cladding 222, the relative refractive index difference $\Delta n_1$ of the inner core 211 is given by $(n_1^2 - n_4^2)/2n_4^2$, the relative refractive index difference $\Delta n_2$ of the outer core 212 is given by $(n_2^2 - n_4^2)/2n_4^2$, and the relative refractive index difference $\Delta n_3(r)$ of the inner cladding 221 is given by $(n_3(r)^2 - n_4^2)/2n_4^2$. Here, the refractive indices in the above-mentioned expression can be placed in any order, whereby a glass region whose relative refractive index difference with respect to the outer cladding 222 is a negative value refers to a glass region having a refractive index lower than the refractive index $n_4$ of the outer cladding 222. In this specification, the relative refractive index difference of each glass region is expressed in terms of percentage.

Experiment 1

An experiment carried out for demonstrating a relationship between the nonlinear refractive index $N_2$ and the gradient of refractive index profile 250 in the optical fiber 200 according to the first embodiment will now be explained.

Figure 4A:
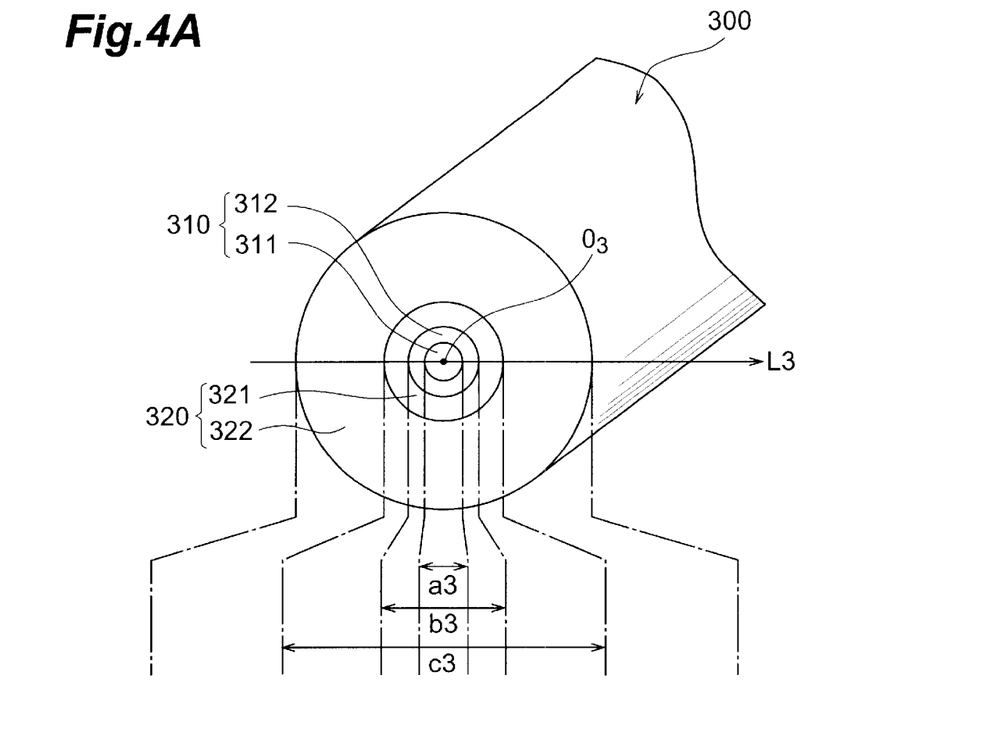
FIGS. 4A and 4B are views illustrating a reference optical fiber as a standard prepared for an experiment to demonstrate a relationship between the nonlinear refractive index and gradient of refractive index profile in the optical fiber according to the first embodiment, showing a cross-sectional structure thereof and a refractive index profile thereof, respectively.
Figure 4B:
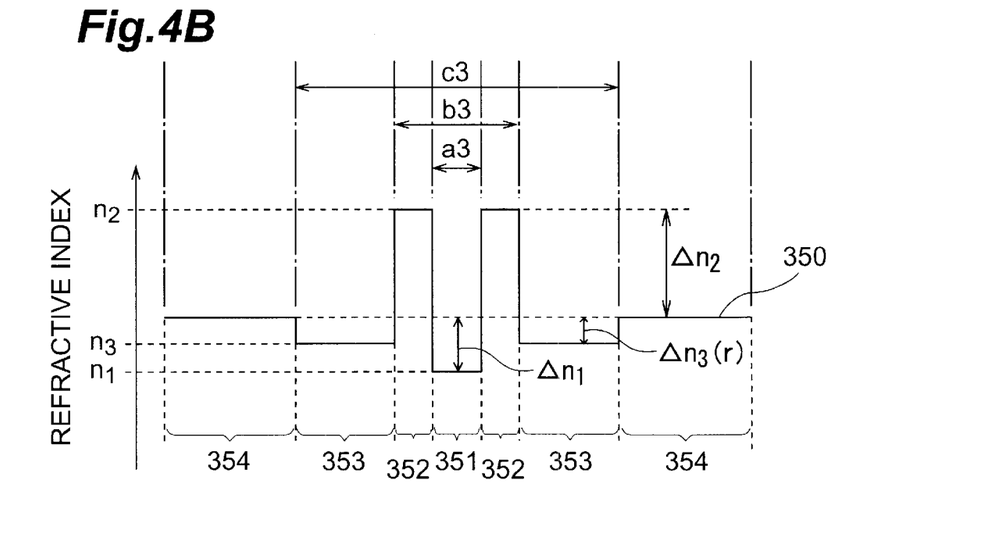
Figure 5A:
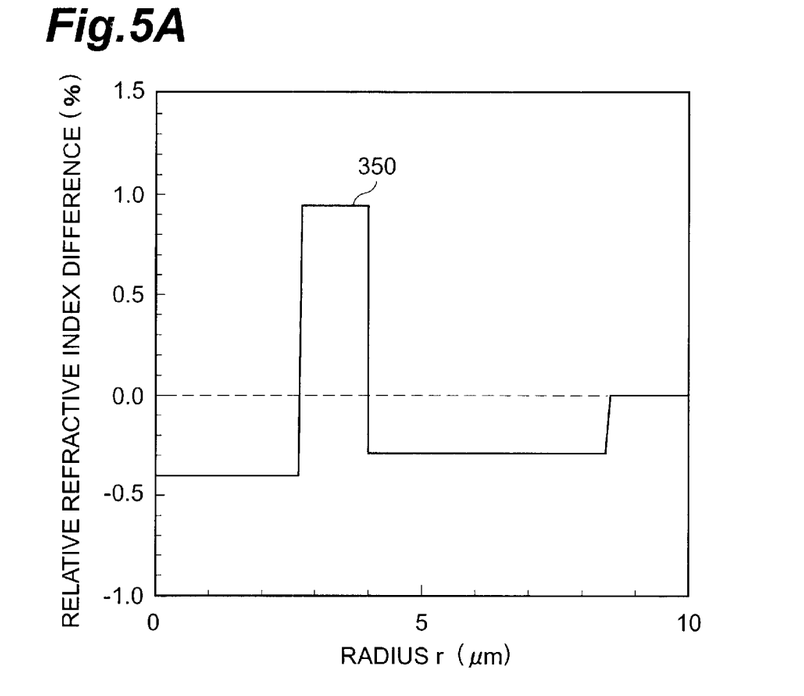
FIGS. 5A and 5B are graphs respectively showing a relationship between the refractive index profile and optical power distribution in the reference optical fiber shown in FIGS. 4A and 4B.
Figure 5B:
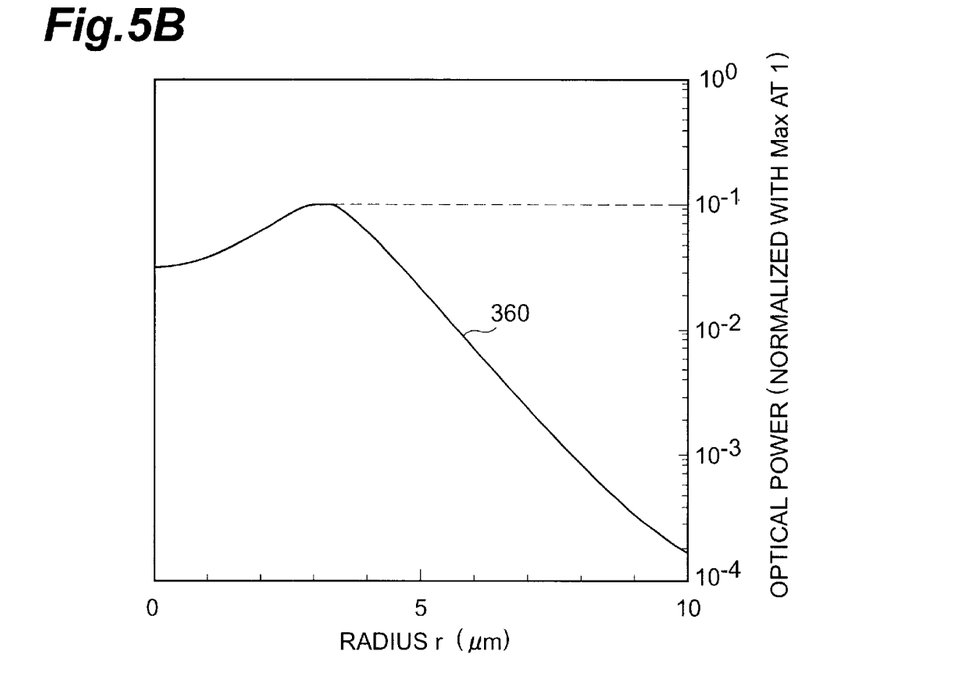

FIGS. 4A and 4B are views illustrating a reference optical fiber 300 prepared as a standard for Experiment 1, showing a cross-sectional structure thereof and a refractive index profile thereof, respectively. FIGS. 5A and 5B are graphs respectively showing a relationship between the refractive index profile 350 and optical power distribution 360 in the reference optical fiber 300 shown in FIGS. 4A and 4B. The optical power distribution 360 in FIG. 5B is normalized with its maximum value taken as 1.

The reference optical fiber 300 and the optical fiber 200 according to the first embodiment structurally differ from each other only in the shape of the relative refractive index difference profile in the inner cladding 221. Hence, in the reference optical fiber 300, the core region 310 is constituted by an inner core 311 having a refractive index $n_1$ and an outside diameter a3, and an outer cladding 312 having a refractive index $n_2$ ($>n_1$) and an outside diameter b3; whereas the cladding region 320 is constituted by an inner cladding 321 having a refractive index $n_3$ ($<n_2$) and an outside diameter c3, and an outer cladding 322 having a refractive index $n_4$ ($>n_3$). In the reference optical fiber 300, the relative refractive index difference $\Delta n_3$ of the inner cladding 321 with respect to the outer cladding 322 is constant (the gradient (%/μm) of refractive index profile is 0).

The refractive index profile 350 of FIG. 4B indicates the respective relative refractive index differences (defined as in the first embodiment) of glass regions 311, 312, 321 with respect to the outer cladding 322 in FIG. 4A, such that areas 351, 352, 353, and 354 correspond to individual parts on the line L3 of the inner core 311, outer core 312, inner cladding 321, and outer cladding 322, respectively. Here, $O_3$ in FIG. 4A is the intersection between the center axis of the reference optical fiber 300 and the line L3.

In the prepared reference optical fiber 300, individual composition parameters are given as follows:

$\Delta n_1$ (%): −0.39
$\Delta n_2$ (%): 0.95
$\Delta n_3$ (%): −0.29
a3/b3: 0.62
c3/b3: 2.0
c3 (μm): 17.0

Also, in the reference optical fiber 300 constructed as mentioned above, the radius (a3/2) of the inner core 311 is 2.6 μm, whereas the cutoff wavelength at a length of 2 m is 1.45 μm. With respect to light having a wavelength of 1550 nm, the prepared reference optical fiber 300 has various characteristics as follows:

dispersion value (ps/nm/km): −2.0
effective area $A_{eff}$ (μm$^2$): 85
nonlinear refractive index (10$^{-20}$ m$^2$/W): 3.730
mode field diameter MFD (μm): 7.04

Here, the constant of proportion k in the above-mentioned expression (4) indicating the relationship between effective area $A_{eff}$ and mode field diameter MFD was 2.18.

In the reference optical fiber 300, each glass region contributes to the nonlinear refractive index $N_2$ as follows:

inner core: 18.1%
outer core: 52.5%
inner cladding: 28.8%
outer cladding: 0.6%

Figure 6:
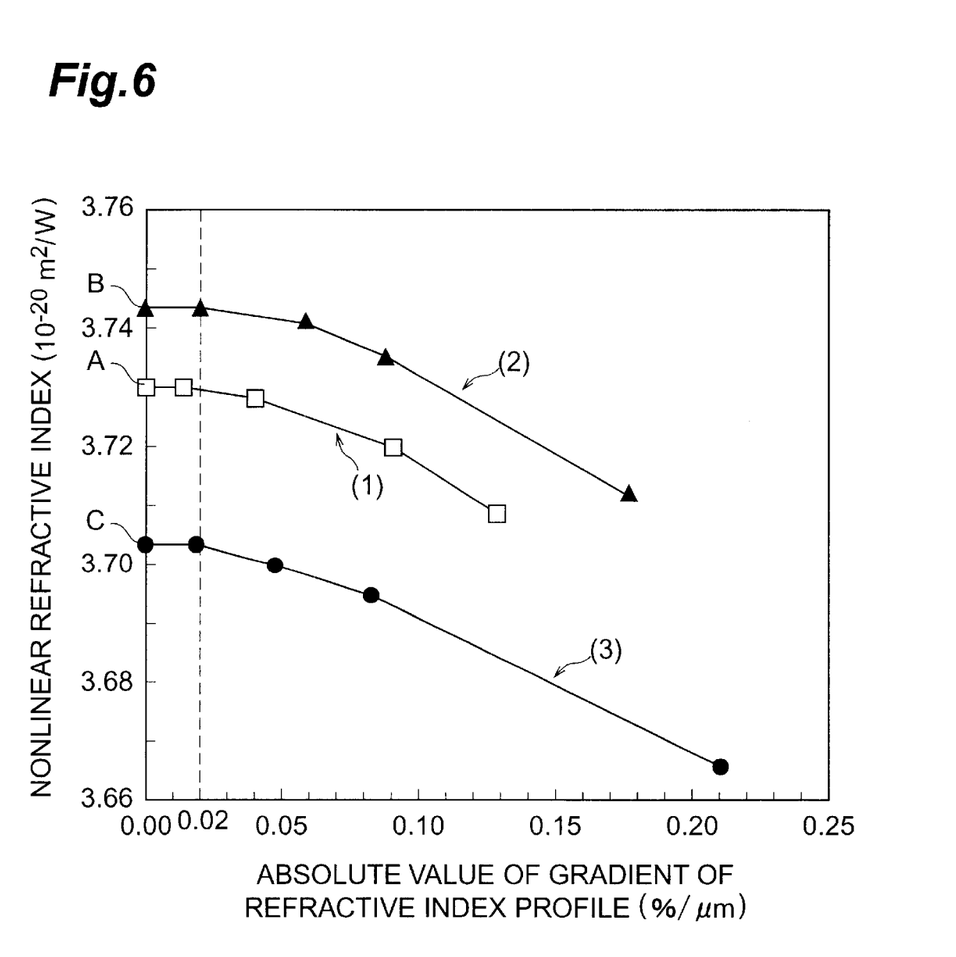
FIG. 6 is a graph showing the respective results of measurement in Experiments 1 to 3 demonstrating relationships between the nonlinear refractive index and gradient of refractive index profile in the optical fibers according to the first and second embodiments.

In Experiment 1, a plurality of sample optical fibers in which the gradient (%/μm) of refractive index profile in the inner cladding 321 was varied with reference to the above-mentioned reference optical fiber 300 without changing the above-mentioned various characteristics at 1550 nm were prepared, and the nonlinear refractive index $N_2$ ($m^2$/W) of each of these sample optical fibers was measured. Curve (1) in FIG. 6 is the result of measurement of Experiment 1. In this curve (1), point A corresponds to the reference optical fiber 300 shown in FIGS. 4A and 4B.

In Experiment 1, while the average $\Delta n_{3AVE}$ of relative refractive index difference $\Delta n_3(r)$ in the inner cladding with a tilted refractive index profile (corresponding to the inner cladding 221 of the first embodiment), the relative refractive index difference $\Delta n_1$ of the inner core with respect to the outer cladding, and the outside diameter ratio c3/b3 of the inner cladding to the outer core are fixed among the prepared sample optical fibers, the relative refractive index difference $\Delta_{n3}(r)$ of the inner cladding with respect to the outer cladding is varied individually.

In each of thus prepared optical fibers, the relative refractive index difference $\Delta n_2$ of the outer core with respect to the outer cladding and the outside diameter ratio a3/b3 of the inner core with respect to the outer core are adjusted according the change in relative refractive index difference $\Delta n_3(r)$ such that various characteristics with respect to light having a wavelength of 1550 nm do not change. In each sample optical fiber, the average $\Delta n_{3AVE}$ of relative refractive index difference $\Delta n_3(r)$ in the inner cladding is given by the following expression (6):

$$\Delta n_{AVE} = \int_b^c \Delta n_3(r) r \, dr \Big/ \int_b^c r \, dr. \tag{6}$$

As can be seen from curve (1) in FIG. 6 indicating the result of measurement of Experiment 1, the effect on lowering the nonlinear refractive index $N_2$ becomes greater when the absolute value of gradient of refractive index profile in the inner cladding exceeds 0.02%/μm.

Experiment 2

The reference optical fiber prepared in Experiment 2 is an optical fiber comprising a structure similar to the above-mentioned optical fiber 300 shown in FIGS. 4A and 4B, and having composition parameters as follows. With reference to this reference optical fiber, the nonlinear refractive index $N_2$ ($m^2$/W) is measured in various sample optical fibers among which the gradient of refractive index profile is varied. Curve (2) in FIG. 6 indicates the result of measurement of Experiment 2.

$\Delta n_1$ (%): −0.50
$\Delta n_2$ (%): 0.90
$\Delta n_3$ (%): −0.40
a3/b3: 0.60
c3/b3: 2.0
c3 (μm): 18.0

Also, in the reference optical fiber 300 constructed as mentioned above, the radius (a3/2) of the inner core 311 is 2.7 μm, whereas the cutoff wavelength at a length of 2 m is 1.45 μm. With respect to light having a wavelength of 1550 nm, the prepared reference optical fiber 300 has various characteristics as follows:

dispersion value (ps/nm/km): −2.0
effective area $A_{eff}$ (μm$^2$): 85
cutoff wavelength at a length of 2 m (μm): 1.45
nonlinear refractive index ($10^{-20}$ m$^2$/W): 3.743
mode field diameter MFD (μm): 6.79

Here, the constant of proportion k in the above-mentioned expression (4) indicating the relationship between effective area $A_{eff}$ and mode field diameter MFD was 2.35.

In Experiment 2, as in the above-mentioned Experiment 1, a plurality of sample optical fibers in which the gradient (%/μm) of refractive index profile in the inner cladding was varied with reference to the prepared reference optical fiber without changing the above-mentioned various characteristics with respect to light having a wavelength of 1550 nm were prepared, and the nonlinear refractive index $N_2$ ($m^2$/W) of each of these sample optical fibers was measured. Curve (2) in FIG. 6. is the result of this experiment. In this curve (2), point B corresponds to the reference optical fiber prepared in Experiment 2.

Also in Experiment 2, while the average $\Delta n_{3AVE}$ of relative refractive index difference $\Delta n_3(r)$ in the inner cladding with a tilted refractive index profile (corresponding to the inner cladding 221 of the first embodiment), the relative refractive index difference $\Delta n_1$ of the inner core with respect to the outer cladding, and the outside diameter ratio c3/b3 of the inner cladding to the outer core are fixed among the prepared sample optical fibers, the relative refractive index difference $\Delta n_3(r)$ of the inner cladding with respect to the outer cladding is varied individually.

As can also be seen from curve (2) in FIG. 6 indicating the result of measurement of Experiment 2, the effect on lowering the nonlinear refractive index $N_2$ becomes greater when the absolute value of gradient of refractive index profile in the inner cladding exceeds 0.02%/μm.

Second Embodiment

A second embodiment of the optical fiber according to the present invention will now be explained with reference to FIGS. 7A and 7B. The optical fiber according to the second embodiment has a refractive index profile of a dual ring core structure.

FIGS. 7A and 7B are views illustrating the second embodiment of the optical fiber according to the present invention, showing a cross-sectional structure thereof and a refractive index profile (dual ring core structure) thereof, respectively. The optical fiber 400 according to the second embodiment is also an optical fiber, mainly composed of silica glass, having a core region 410 extending along the center axis and a cladding region 420 formed at the outer periphery of the core region 410. The core region 410 in the optical fiber 400 is constituted by a first core 411 having a refractive index $n_1$ and an outside diameter a4; a second core 412 provided on the outer periphery of the first core 411 and having a refractive index $n_2$ (>$n_1$) and an outside diameter b4; a third core 413 provided on the outer periphery of the second core 412, doped with fluorine such that its refractive index $n_3(r)$ (<$n_2$) gradually decreases from the center of the optical fiber 400 toward the perimeter, and having an outside diameter c4; and a fourth core 414 provided on the outer periphery of the third core 413 and having a refractive index $n_4$ (>$n_3(r)$) and an outside diameter d4. The cladding region 420 has a lower refractive index $n_5$ than the fourth core 414. Here, r is the radial distance from the center of the optical fiber 400.

Therefore, in the optical fiber 400 according to the second embodiment, the first core 411, second core 412, and third core 413 correspond to the center region 101, first annular region 102, and second annular region 103, respectively.

The abscissa of the refractive index profile 450 shown in FIG. 7B corresponds to each position of the line L4 in FIG. 7A, whereas $O_4$ in FIG. 7A indicates the intersection between the center axis of the optical fiber 400 and the line L4. Specifically, this refractive index profile 450 indicates the respective relative refractive index differences of the glass regions 411, 412, 413, and 414 with respect to the cladding region 420, such that areas 451, 452, 453, 454, and 455 correspond to individual parts on the line L4 of the first core 411, second core 412, third core 413, fourth core 414, and cladding region 420, respectively.

Also in the second embodiment, the respective relative refractive index differences $\Delta n_1$, $\Delta n_2$, $\Delta n_3(r)$, and $\Delta n_4$ of the glass regions 411, 412, 413, 414 with respect to the cladding region 420 are given by the above-mentioned expression (5). Namely, in expression (5), $n_r$ corresponds to the respective refractive indices $n_1$, $n_2$, $n_3(r)$, $n_4$ of the glass regions 411, 412, 413, 414, whereas $n_c$ corresponds to the refractive index $n_5$ of the cladding region 420.

Experiment 3

An experiment carried out for demonstrating a relationship between the nonlinear refractive index $N_2$ and the gradient of refractive index profile 450 in the optical fiber 400 according to the second embodiment will now be explained.

Figure 8A:
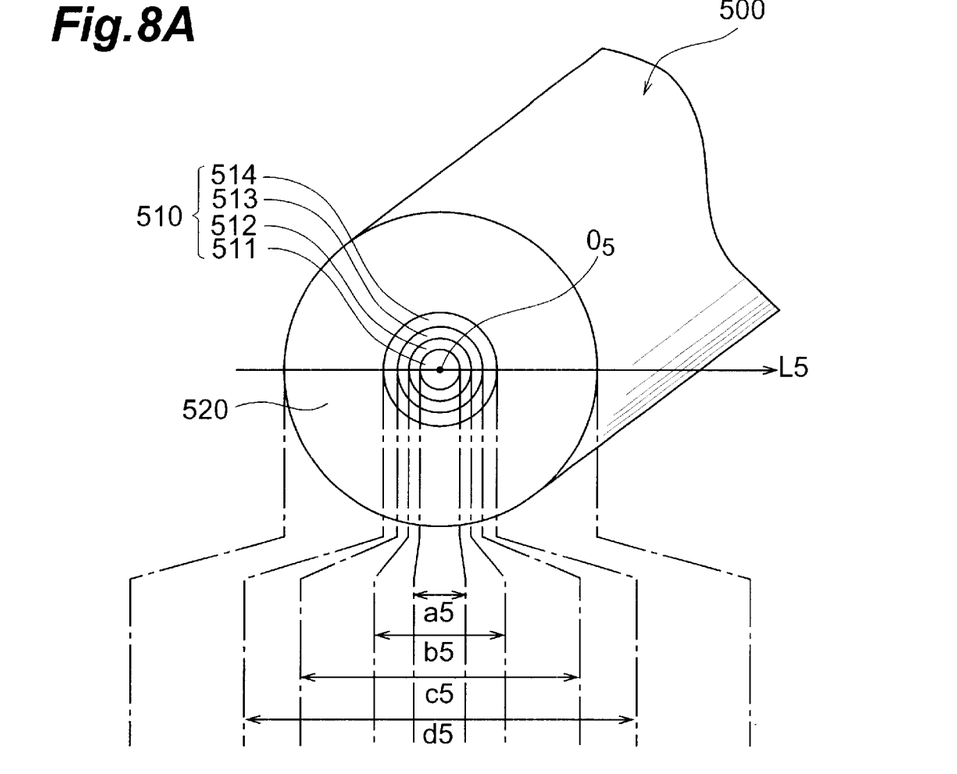
FIGS. 8A and 8B are views illustrating a reference optical fiber as a standard prepared for an experiment to demonstrate a relationship between the nonlinear refractive index and gradient of refractive index profile in the optical fiber according to the third embodiment, showing a cross-sectional structure thereof and a refractive index profile thereof, respectively.
Figure 8B:
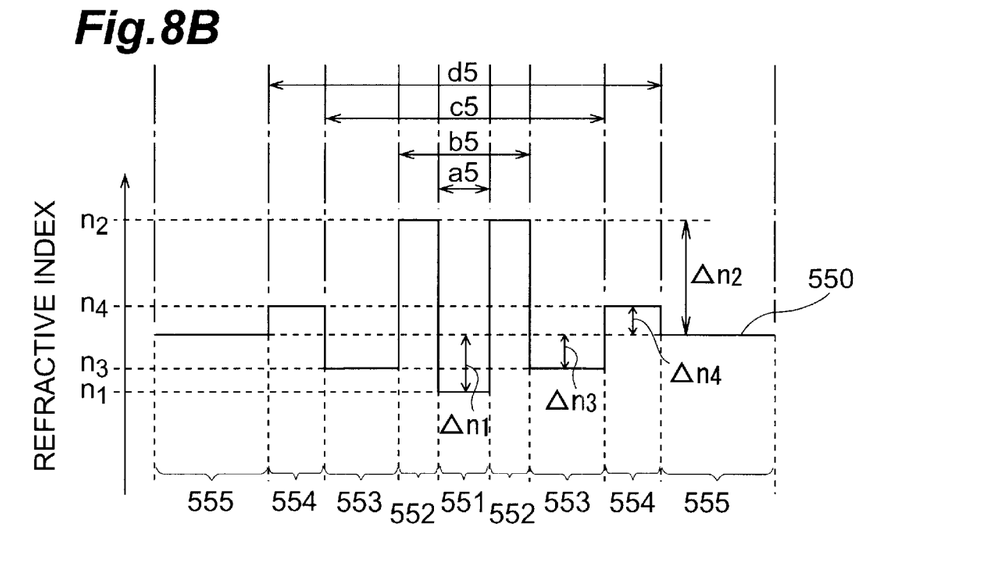

FIGS. 8A and 8B are views illustrating a reference optical fiber 500 prepared as a standard for Experiment 3, showing a cross-sectional structure thereof and a refractive index profile thereof, respectively.

The reference optical fiber 500 and the optical fiber 400 according to the second embodiment structurally differ from each other only in the shape of the relative refractive index difference profile in the third core 413. Hence, in the reference optical fiber 500, the core region 510 is constituted by a first core 511 having a refractive index $n_1$ and an outside diameter a5, a second core 512 having a refractive index $n_2$ (>$n_1$) and an outside diameter b5, a third core 513 having a refractive index $n_3$ (<$n_2$) and an outside diameter c5, and a fourth core 514 having a refractive index $n_4$ (>$n_3$) and an outside diameter d5, whereas the cladding region 520 has a lower refractive index $n_5$ than the fourth core 514. In the reference optical fiber 500, the relative refractive index difference $\Delta n_3$ of the third core 513 with respect to the cladding region 520 is constant (the gradient (%/μm) of refractive index profile is 0).

The refractive index profile 550 of FIG. 8B indicates the respective relative refractive index differences (defined as in the second embodiment) of glass regions 511, 512, 513, 514 with respect to the cladding region 520 in FIG. 8A, such that areas 551, 552, 553, 554, and 555 correspond to individual parts on the line L5 of the first core 511, second core 512, third core 513, fourth core 514, and cladding region 520, respectively. Here, $O_5$ in FIG. 8A is the intersection between the center axis of the reference optical fiber 500 and the line L5.

In the prepared reference optical fiber 500, individual composition parameters are given as follows:

$\Delta n_1$ (%): −0.40
$\Delta n_2$ (%): 0.90
$\Delta n_3$ (%): −0.40
$\Delta n_4$ (%): −0.28
a5/b5: 0.50
c5/b5: 1.5
c5/d5: 0.75
d5 (μm): 14.4

Also, in the reference optical fiber 500 constructed as mentioned above, the radius (a5/2) of the first core 511 is 1.8 μm, whereas the cutoff wavelength at a length of 2 m is 1.42 μm. With respect to light having a wavelength of 1550 nm, the prepared reference optical fiber 500 has various characteristics as follows:

dispersion value (ps/nm/km): −2.6
effective area $A_{eff}$ (m$^2$): 76
nonlinear refractive index ($10^{-20}$ m$^2$/W): 3.704
mode field diameter MFD (μm): 7.78

Here, the constant of proportion k in the above-mentioned expression (4) indicating the relationship between effective area $A_{eff}$ and mode field diameter MFD was 1.59.

In Experiment 3, a plurality of sample optical fibers in which the gradient (%/μm) of refractive index profile in the third core 513 was varied with reference to the above-mentioned reference optical fiber 500 without changing the above-mentioned various characteristics with respect to light having a wavelength of 1550 nm were prepared, and the nonlinear refractive index $N_2$ (m$^2$/W) of each of these sample optical fibers was measured. Curve (3) in FIG. 6 is the result of measurement of Experiment 3. In this curve (3), point C corresponds to the reference optical fiber 500 shown in FIGS. 8A and 8B.

In Experiment 3, while the average $\Delta n_{3AVE}$ of relative refractive index difference $\Delta n_3(r)$ in the third core with a tilted refractive index profile (corresponding to the third core 513 of the second embodiment), the outside diameter ratio c5/b5 of the third core to the second core, the outside diameter ratio c5/d5 of the third core to the fourth core, the relative refractive index difference $\Delta n_1$ of the first core with respect to the cladding region, and the relative refractive index difference $\Delta n_4$ of the fourth core with respect to the cladding region are fixed among the prepared individual sample optical fibers, the relative refractive index difference $\Delta n_3(r)$ of the third core with respect to the cladding region is varied individually.

In each of thus prepared optical fibers, the relative refractive index difference $\Delta n_2$ of the second core with respect to the cladding region and the outside diameter ratio a5/b5 of the first core to the second core are adjusted according the change in relative refractive index difference $\Delta n_3(r)$ such that various characteristics with respect to light having a wavelength of 1550 nm do not change. Also, in each sample optical fiber, the average $\Delta n_{3AVE}$ of relative refractive index difference $\Delta n_3(r)$ in the third core is given by the above-mentioned expression (6).

As can also be seen from curve (3) in FIG. 6 indicating the result of measurement of Experiment 3, the effect on lowering the nonlinear refractive index $N_2$ becomes greater when the absolute value of gradient of refractive index profile in the inner cladding exceeds 0.02%/μm.

As can also be seen from the above-mentioned Experiments 1 to 3, the constant of proportion k in the above-mentioned expression (4) indicating the relationship between the effective area $A_{eff}$ and mode field diameter MFD with respect to light having a wavelength of 1550 nm is preferably 1.4 or more. Also, the radius of the center region is preferably set to 1.5 μm or more.

Figure 9:
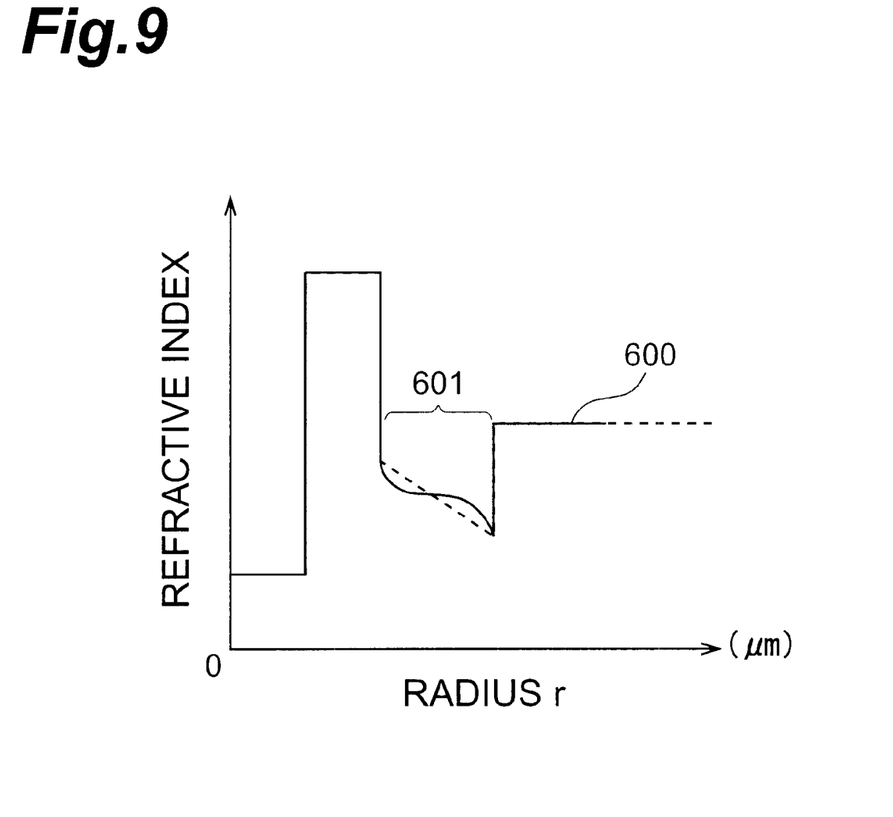
FIG. 9 is a view for explaining a modified example of the refractive index profile in the optical fiber according to the present invention.

In addition, while each of the above-mentioned embodiments relates to the case where the refractive index profile of the second annular region (corresponding to the inner cladding 221 in the first embodiment and the third core 413 in the second embodiment) in the optical fiber according to the present invention has a linear form, in the case where the form of a refractive index profile is not linear as shown in FIG. 9, the value (%/μm) indicating the gradient of a depressed portion 601 in the refractive index profile 600 is given as the gradient of an approximate line obtained by the method of least squares or the like.

As in the foregoing, since the outer periphery of a glass region, positioned at the center part, constituting a refractive index profile of a ring-like core is provided with an annular region whose refractive index gradually decreases from the center of the optical fiber toward the perimeter, the present invention is effective in that it can more effectively suppress the occurrence of nonlinear phenomena by lowering its nonlinear refractive index.

Also, according to the inventors' findings, the effect of lowering the nonlinear refractive index is obtained when the absolute value of gradient of refractive index profile in the above-mentioned annular region exceeds 0.02%/μm.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber having a core region extending along a predetermined center axis and a cladding region provided on the outer periphery of said core region, said optical fiber having an effective area of 70 μm² or more with respect to light having a wavelength of 1550 nm and comprising:

a center region having a predetermined refractive index;

a first annular region provided on the outer periphery of said center region and having a refractive index higher than that of said center region; and a second annular region provided on the outer periphery of said first annular region and doped with fluorine whose contents are adjusted such that said second annular region has a refractive index decreasing with distance from the center axis of said optical fiber:

$$k = A_{eff}/((\pi/4) \cdot (MFD)^2) \geq 1.4$$

wherein $A_{eff}$ and MFD are the effective area and mode field diameter with respect to light having a wavelength of 2550 nm, respectively.

2. An optical fiber having a core region extending along a predetermined center axis and a cladding region provided on the outer periphery of said core region, said optical fiber having an effective area of 70 μm² or more with respect to light having a wavelength of 1550 nm and comprising:

a center region having a predetermined refractive index;

a first annular region provided on the outer periphery of said center region and having a refractive index higher than that of said center region; and a second annular region provided on the outer periphery of said first annular region and doped with fluorine whose contents are adjusted such that said second annular region has a refractive index decreasing with distance from the center axis of said optical fiber, wherein:

said core region comprises an inner core corresponding to said center region, and an outer core corresponding to said first annular region;

wherein said cladding region comprises an inner cladding corresponding to said second annular region, and an outer cladding provided on the outer periphery of said inner cladding and having a higher refractive index than said inner cladding; and wherein the gradient of refractive index in said inner cladding corresponding to said second annular region is given by the relative refractive index difference of said inner cladding with respect to said outer cladding and a radial distance from the center axis of said optical fiber, and has an absolute value of 0.02%/μm or more.

3. An optical fiber having a core region extending along a predetermined center axis and a cladding region provided on the outer periphery of said core region, said optical fiber having an effective area of 70 μm² or more with respect to light having a wavelength of 1550 nm and comprising:

a center region having a predetermined refractive index;

a first annular region provided on the outer periphery of said center region and having a refractive index higher than that of said center region; and a second annular region provided on the outer periphery of said first annular region and doped with fluorine whose contents are adjusted such that said second annular region has a refractive index decreasing with distance from the center axis of said optical fiber wherein:

said core region comprises a first core corresponding to said center region, a second core corresponding to said first annular region, a third core corresponding to said second annular region, and a fourth core provided on the outer periphery of said third core and having a higher refractive index than said core;

said cladding region has a lower refractive index than said fourth core; and the gradient of refractive index in said third core corresponding to said second annular region is given by the relative refractive index difference of said third core with respect to said cladding region and a radial distance from the center axis of said optical fiber, and has an absolute value of 0.02%/μm or more.

4. An optical fiber having a core region extending along a predetermined center axis and a cladding region provided on the outer periphery of said core region, said optical fiber having an effective area of 70 μm² or more with respect to light having a wavelength of 1550 nm and comprising:

a center region having a predetermined refractive index;

a first annular region provided on the outer periphery of said center region and having a refractive index higher than that of said center region; and a second annular region provided on the outer periphery of said first annular region and doped with fluorine whose contents are adjusted such that said second annular region has a refractive index decreasing with distance from the center axis of said optical fiber, wherein said optical fiber has a dispersion with an absolute value of 1.0 to 4.5 ps/nm/km and an effective area of 70 μm², or more with respect to light having a wavelength of 1550 nm, and has a cutoff wavelength of 1.3 μm or more at a fiber length of 2 m.

* * * * *